United States Patent
Bono et al.

(10) Patent No.: US 9,384,206 B1
(45) Date of Patent: Jul. 5, 2016

(54) MANAGING DATA DEDUPLICATION IN STORAGE SYSTEMS

(71) Applicant: EMC Corporation, Hopkinton, MA (US)

(72) Inventors: Jean-Pierre Bono, Westborough, MA (US); Dennis T. Duprey, Raleigh, NC (US); Xiangping Chen, Sherborn, MA (US); Philippe Armangau, Acton, MA (US); Monica Chaudhary, South Grafton, MA (US); Mark K. Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 184 days.

(21) Appl. No.: 14/141,287

(22) Filed: Dec. 26, 2013

(51) Int. Cl.
  *G06F 17/30* (2006.01)
  *G06F 3/06* (2006.01)

(52) U.S. Cl.
  CPC ........ *G06F 17/30156* (2013.01); *G06F 3/0608* (2013.01); *G06F 3/0647* (2013.01); *G06F 3/0683* (2013.01); *G06F 17/3033* (2013.01); *G06F 17/30091* (2013.01); *G06F 17/30159* (2013.01); *G06F 17/30162* (2013.01)

(58) Field of Classification Search
  CPC ............ G06F 11/1453; G06F 11/1456; G06F 11/1464; G06F 11/1448; G06F 3/0608; G06F 17/30082; G06F 17/30085; G06F 17/30182; G06F 3/0689; G06F 3/0683; G06F 3/0641; G06F 3/067; G06F 3/0604; G06F 3/065; G06F 3/0647; G06F 17/30371; G06F 17/30607; G06F 17/30156; G06F 17/30091; G06F 17/30135; G06F 17/30155; G06F 17/30321; G06F 17/30162; G06F 17/3033; G06F 2003/0697; H03M 7/3091
  See application file for complete search history.

(56) References Cited

U.S. PATENT DOCUMENTS

| | | | | |
|---|---|---|---|---|
| 7,567,188 B1 * | 7/2009 | Anglin | ................. | G06F 3/0608 341/63 |
| 7,921,086 B1 * | 4/2011 | Bromley | ........... | G06F 17/30067 707/692 |
| 8,140,821 B1 * | 3/2012 | Raizen | ................ | G06F 11/1448 707/637 |
| 8,615,498 B1 * | 12/2013 | Bromley | ............... | G06F 3/0608 707/664 |
| 8,898,121 B2 * | 11/2014 | Amit | ................. | G06F 17/30159 707/692 |
| 2004/0250034 A1 * | 12/2004 | Yagawa | .............. | G06F 11/2058 711/162 |
| 2007/0208788 A1 * | 9/2007 | Chakravarty | ....... | G06F 11/1451 |
| 2009/0063563 A1 * | 3/2009 | Khangaonkar | ... | G06F 17/30557 |
| 2009/0204636 A1 * | 8/2009 | Li | ........................ | G06F 17/3015 |
| 2009/0271402 A1 * | 10/2009 | Srinivasan | .......... | G06F 17/3015 |
| 2010/0082558 A1 * | 4/2010 | Anglin | ................. | G06F 3/0604 707/694 |

(Continued)

FOREIGN PATENT DOCUMENTS

WO    WO 01/20470    * 3/2001

OTHER PUBLICATIONS

Benjamin Zhu et al., "Avoiding the Disk Bottleneck in the Data Domain Deduplication File System",Data Domain, Inc.,FAST '08: 6th USENIX Conference on File and Storage Technologies, pp. 269-282.*

*Primary Examiner* — Srirama Channavajjala
(74) *Attorney, Agent, or Firm* — Krishnendu Gupta; Jason A. Reyes; Deepika Bhayana

(57) ABSTRACT

A method is used in managing data deduplication in storage systems. Characteristics of first and second data objects are evaluated based on a set of deduplication policies. The first and second data objects are selected for deduplication. Based on the evaluation, deduplication performed on the first and second data objects is affected.

16 Claims, 5 Drawing Sheets

(56) References Cited

U.S. PATENT DOCUMENTS

| | | | |
|---|---|---|---|
| 2010/0332456 A1* | 12/2010 | Prahlad | G06F 17/3002 707/664 |
| 2011/0125722 A1* | 5/2011 | Rao | G06F 17/30156 707/693 |
| 2012/0166403 A1* | 6/2012 | Kim | G06F 17/30156 707/692 |
| 2013/0054927 A1* | 2/2013 | Raj | G06F 3/0608 711/170 |
| 2013/0318053 A1* | 11/2013 | Provenzano | G06F 17/30162 707/692 |

* cited by examiner

MANAGING DATA DEDUPLICATION IN STORAGE SYSTEMS

CROSS REFERENCE TO RELATED APPLICATIONS

This application is related to co-pending U.S. patent application No. 14/141,221 entitled MANAGING DATA DEDUPLICATION IN STORAGE SYSTEMS BASED ON I/O ACTIVITIES filed on Dec. 26, 2013, and U.S. patent application No. 14/141,258 entitled MANAGING DATA DEDUPLICATION IN STORAGE SYSTEMS BASED ON STORAGE SPACE CHARACTERISTICS filed on Dec. 26, 2013, which is incorporated herein by reference.

BACKGROUND

1. Technical Field

This application relates to managing data deduplication in storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Deduplication is a space-saving technology intended to eliminate redundant (duplicate) data (such as, files) on a data storage system. By saving only one instance of a file, disk space can be significantly reduced. For example, a file of size 10 megabytes (MB) may be stored in ten folders of each employee in an organization that has ten employees. Thus, in such a case, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges, especially when managing the process of deduplicating data.

SUMMARY OF THE INVENTION

A method is used in managing data deduplication in storage systems. Characteristics of first and second data objects are evaluated based on a set of deduplication policies. The first and second data objects are selected for deduplication. Based on the evaluation, deduplication performed on the first and second data objects is affected.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
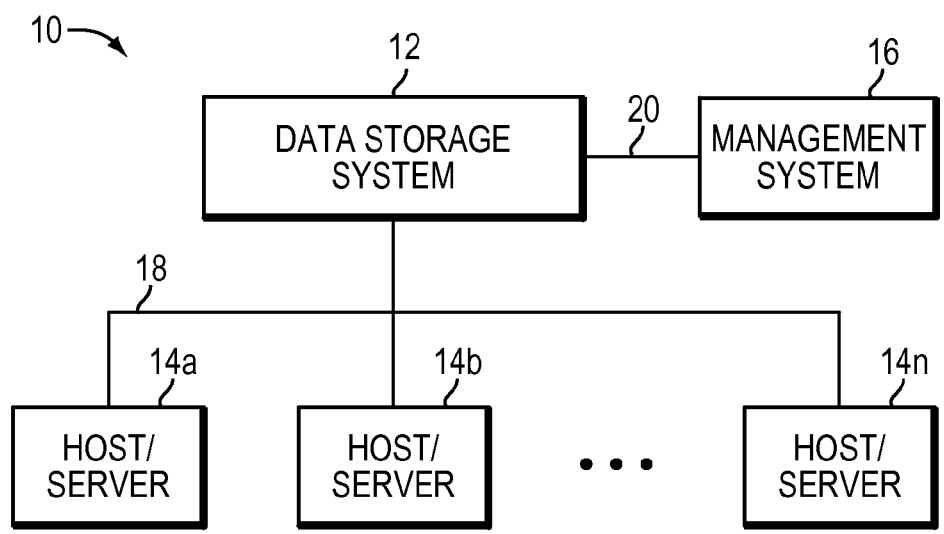
FIGS. 1-2 are examples of an embodiment of a computer system that may utilize the techniques described herein.

Described below is a technique for use in managing data deduplication in storage systems, which technique may be used to provide, among other things, evaluating characteristics of first and second data objects based on a set of deduplication policies, where the first and second data objects are selected for deduplication, and based on the evaluation, affecting deduplication performed on the first and second data objects.

Data deduplication is a process by which a data storage system can detect multiple identical copies of data and only keep a single copy of that data, thus eliminating the redundant data by removing other copies of that data and thus improving storage utilization. Thus, the data deduplication process has the ability to detect common blocks of data and maintain a single copy of the common blocks, thereby increasing the efficiency of storage devices by storing data in a reduced number of physical blocks. In at least some systems, data deduplication requires iterating over set of data blocks in one or more storage extents of a deduplication domain by processing digest information associated with each data block, finding the data blocks that contain identical information, and mapping the identical data blocks to a single copy of the data. Thus, in a deduplicated system, a single data block may represent a large number such as hundreds of deduplicated data blocks such that each deduplicated data block refers to the single data block stored on a storage device (e.g. a disk). In such systems, an index table of unique digests is created to find commonality among the data set. The size of this index table determines a window of deduplication opportunity. The larger the index table, the more blocks can be checked for duplicates, and thus the larger the opportunity for deduplication.

Generally, data deduplication for feature software requires that data blocks in a storage extent be iterated through based on a specific iteration scheme. A set of storage extents that are deduplicated together form a deduplication domain. During iteration of a deduplication domain, an index table of unique digests is created from data blocks that are iterated through. Further, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Thus, deduplication maps data blocks that contain identical information to a single copy of the data thereby consolidating I/O operations directed to the identical data blocks to the single copy of the data.

In a conventional deduplication system, if a matching digest for a data block is found in an index table, the data block is deduplicated to an identical data block associated with the matching digest found in the index table by simply selecting one data block as a master deduplicated copy, updating the mapping of the other identical data block to point to the selected data block, and freeing storage space associated with the identical data block. Thus, in such a conventional system, the conventional technique of deciding which data block to preserve as a deduplicated block is non-deterministic and a data block may simply be selected for example based on an order in which data blocks are identified. Thus, in such a conventional system, based on the order in which addresses of the data block and identical data blocks are aligned with respect to each other, either the address mapping information of the data block is updated to point to the identical data block found using the index table or the address mapping information of the identical data block found using the index table is updated to point to the data block. Thus, in such a conventional system, a data deduplication process does not take into account characteristics of data blocks when mapping the data blocks to a single identical data block. For example, in such a conventional system, a conventional deduplicating technique does not take into account the type of physical storage on which a data block reside. Consequently, in such a conventional system, a data block residing on a storage tier with high performance characteristics may get mapped to a data block residing on a storage tier with low performance characteristics. As a result, in such a conventional system, an I/O performance for a deduplicated data block may be reduced if the deduplicated data block is mapped to a data block which resides on a storage tier with low performance characteristics. Further, conventionally, a data deduplication process does not take into account a deduplication policy when mapping data blocks to a single identical data block for deduplication. For example, in such a conventional system, a conventional deduplicating technique does not take into account a policy such as an access pattern for a data block. Consequently, in such a conventional system, when a cold data block (data block which is accessed less frequently) and a hot data block (data block which is accessed more frequently) are selected for deduplication, the hot data block may get mapped to the cold data block thereby freeing the hot data block. As a result, in such a conventional system, I/O requests directed to the hot data block are redirected to the cold data block thereby impacting I/O performance of users of the hot data block.

By contrast, in at least some implementations in accordance with the technique as described herein, the current technique evaluates characteristics of data which has been identified for deduplication. Further, in at least one embodiment of the current technique, when at least two data objects are identified for deduplication, a set of deduplication policies are evaluated to determine which data object is used as a master copy and which data block is freed. Thus, in at least one embodiment of the current technique, based on the evaluation of a set of deduplication policies and characteristics of data objects, mapping of the data objects is performed during deduplication.

In at least some implementations in accordance with the technique as described herein, the use of the managing data deduplication in storage systems technique can provide one or more of the following advantages: lowering costs by improving deduplication efficiency, improving memory utilization by evaluating characteristics of data objects identified for deduplication, improving I/O performance of a system by deduplicating data blocks based on a set of deduplication policies, and reducing the amount of storage required for data deduplication by adaptively performing deduplication to improve performance of a data storage system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
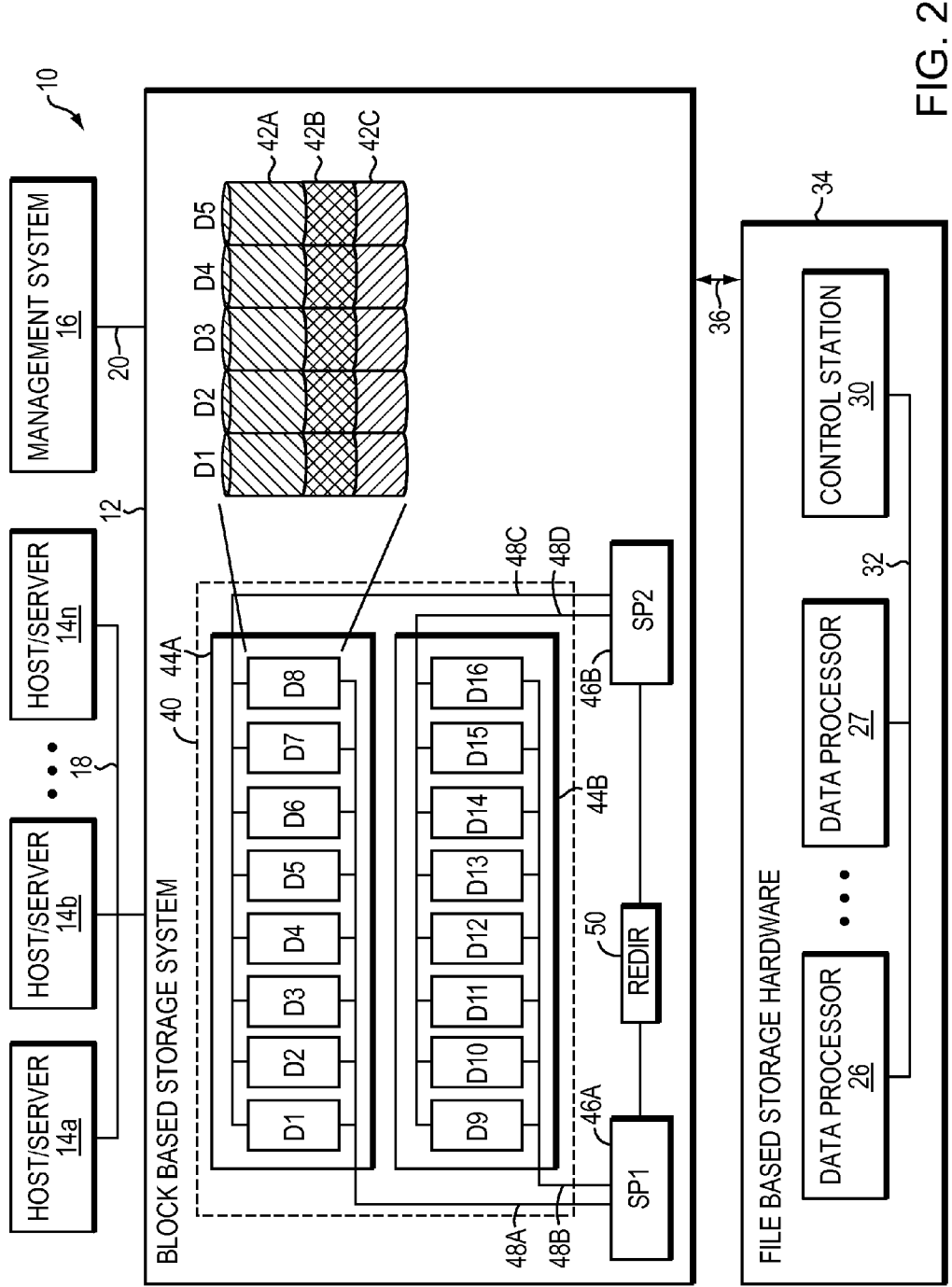

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hard-wired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 1, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
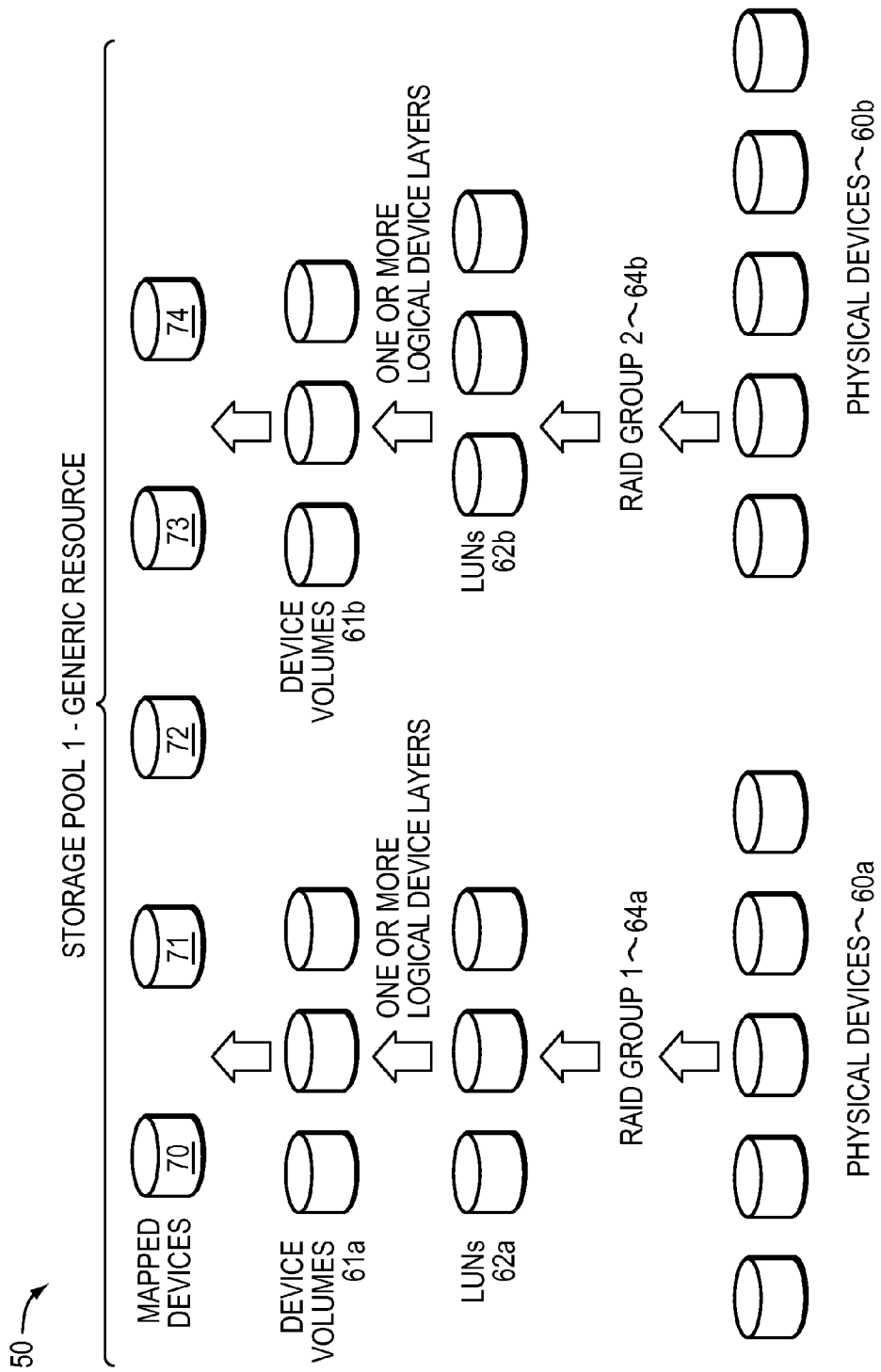
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consists of a set of storage extents which includes a set of deduplicated LUNs sharing a common set of blocks.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
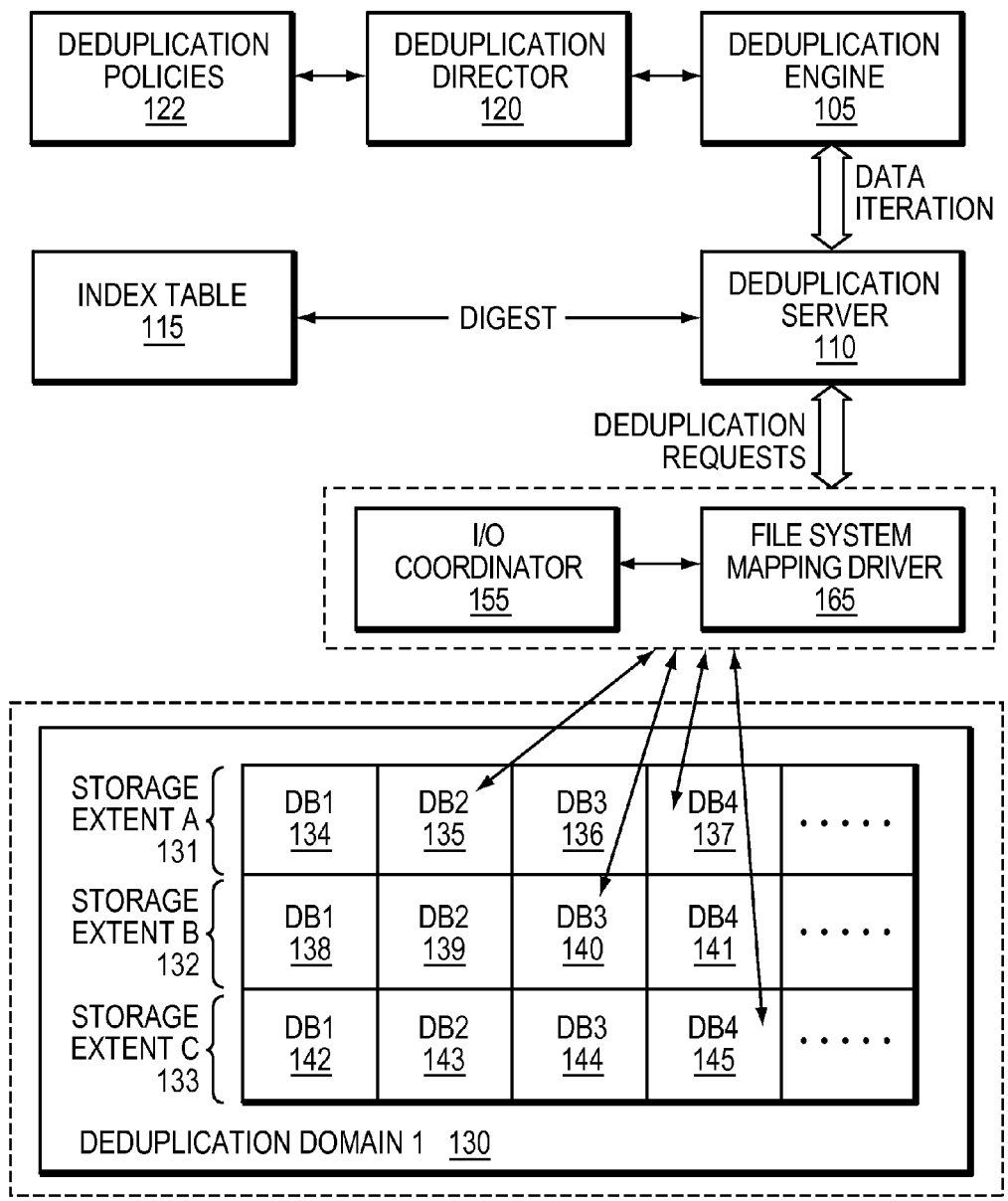
FIG. 4 is a diagram illustrating in more detail components that may be used in connection with techniques herein.

Referring to FIG. 4, shown is a more detailed representation of components that may be included in an embodiment using the techniques herein. With reference also to FIGS. 1-3, in a deduplication domain, each storage extent contains a range of data blocks. For example, in FIG. 4, storage extent A 131, storage extent B 132 and storage extent C 133 are part of the deduplication domain-1 130. Within a data storage system, there may be multiple deduplication domains such as deduplication domain-1 130, and other deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 4, storage extent A 131 includes data blocks 134-137, storage extent B 132 includes data blocks 138-141 and storage extent C 131 includes data blocks 142-145 and other data blocks (not shown).

In at least one embodiment of the current technique, deduplication logic can be provided on data storage system 12. In an alternative embodiment, deduplication logic may be provided also or instead on a host system, such as host system 14. As described elsewhere herein, deduplication logic may be performed in a manner that is transparent to an application running on a host system. In at least one embodiment of the current technique, deduplication server 110 provides deduplication services in data storage system 12 by working in conjunction with I/O Coordinator 155 and File system mapping driver 165. I/O Coordinator 155 manages I/O operations in conjunction with the file system mapping driver 165. I/O Coordinator 155 provides framework for implementing digest and other I/O requests issued by the deduplication server 110. File system mapping driver 165 is a light-weight file system library that provides file system functionality and allows data storage system 12 to create files within a file system. File system mapping driver 165 processes I/Os directed to metadata of a file system and provides information regarding metadata (e.g., deduplication key, data block mapping information) of a data block that is potentially a candidate for deduplication.

In at least one embodiment of the current technique, deduplication director 120 is a process that iterates through deduplication domains including logical units and schedules data deduplication processes based on deduplication policies 122 to perform data deduplication. Further, deduplication director 120 works in conjunction with deduplication engine 105 to perform data deduplication on deduplication domain 130. Thus, deduplication director 120 is a component responsible for coordinating data deduplication operations. As a result, deduplication director 120 identifies data deduplication domains, manages storage space for performing data deduplication, and manages deduplication engine 105 to process each data deduplication domain.

Further, data deduplication engine 105 executes a deduplication job by performing data deduplication on a deduplication domain by iterating through data blocks of the deduplication domain, obtaining digests for the data blocks, identifying deduplication candidates, and issuing deduplication requests to deduplication server 110.

In at least one embodiment of the current technique, deduplication server 110 is a component that provides services to deduplication director 120 to iterate over sets of data in a set of deduplication domain 130. Deduplication server 110 also computes digests and remaps blocks after the deduplication technique is applied to remove duplicate blocks of data. A deduplication database (e.g. an index table) is maintained for a deduplication domain. Deduplication engine 105 communicates with the deduplication server 110 to iterate through the set of deduplication domain 130 and computes digests for data blocks that are iterated through. A digest is created for each chunk of data (e.g., a data block) that is identified as a candidate for deduplication. Deduplication engine 105 detects potential duplicate copies of data and issues a request to the deduplication server 110 to deduplicate the data. The deduplication database is stored on one of the storage extents that include one or more LUNs. An index table 115 may also be maintained on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during deduplication processing.

During deduplication processing as described herein, deduplication server 110 provides services to deduplication engine 105 by interacting with I/O coordinator 155 and file system mapping driver 165. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of file system mapping driver 165. A file system allows dynamic manipulation of the address maps that connects LUN's logical address space to its physical address space. The file system also allows mapping a single block of storage at multiple locations within the file system, and allows handling of writes to shared blocks by allocating new storage and updating the shared address mappings. I/O coordinator 155 manages I/O operations in conjunction with the file system mapping driver 165. I/O coordinator 155 provides framework for implementing digest and other I/O requests issued by the deduplication server 110.

Thus, deduplication engine 105 and deduplication server 110 working in conjunction with one another identify data blocks for deduplication, compare data digest information of the data blocks, identify candidate data blocks for deduplication, issue deduplication requests, and maintain index table 115. Further, I/O coordinator 155 and file system mapping driver 165 working in conjunction with one another process deduplication requests received from deduplication server 110. File system mapping driver 165 performs a deduplication operation by freeing up redundant instances of a deduplicated data block based on a deduplication policy which may take into account information such as characteristics of storage space on which the deduplicated data block reside and I/O access pattern for the deduplicated data block. Further, a file system may use a virtual block mapping pointers (also referred to herein as "VBM pointers") to map a data block.

In at least one embodiment of the current technique, deduplication engine 105 and deduplication server 110 working in conjunction with one another identify data blocks for deduplication such that I/O coordinator 155 and file system mapping driver 165 working in conjunction with one another makes a determination as to how to deduplicate data objects identified for deduplication based on a deduplication policy which may indicate a criteria based on which a data storage system is attempting to optimize a deduplication operation. Thus, in at least one embodiment of the current technique, when data objects are identified for deduplication, file system mapping driver 165 working in conjunction with other components may make a determination based on a deduplication policy as to which data block is freed and which data block is used as a master copy during deduplication.

It should be noted that a set of deduplication policies may be initialized and selected by a data storage system. Further, it should be noted that a set of deduplication policies may be selected by a user of a data storage system.

Generally, a LUN presented to a host system may be organized as a file system by a file system mapping logic of a storage system. A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

Figure 5:
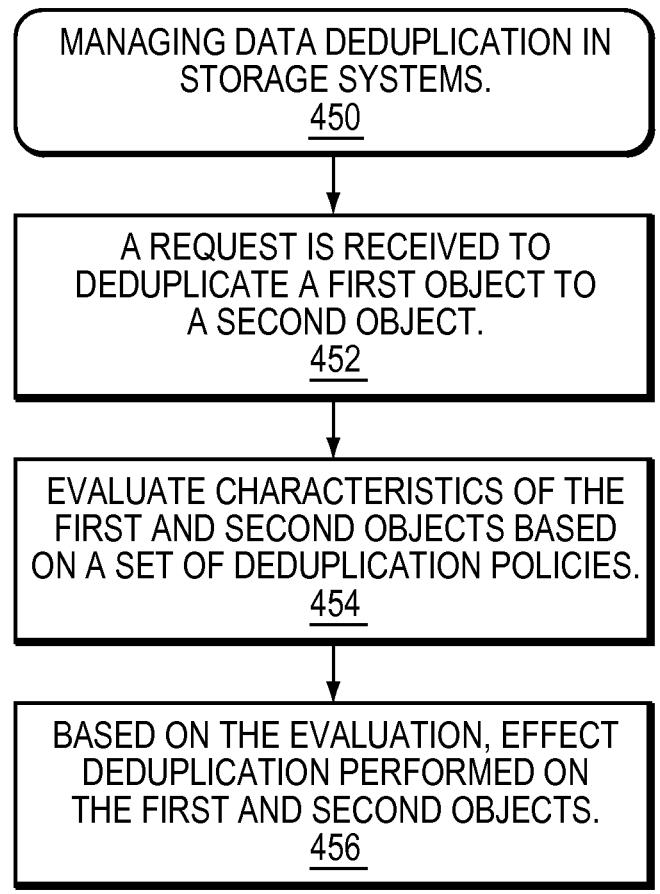
FIG. 5 is a flow diagram illustrating processes that may be used in connection with techniques herein.

Referring to FIG. 5, shown is a flow diagram illustrating a flow of data in the data storage system. With reference also to FIGS. 1-4, data deduplication is managed in a storage system (step 450). A request is received to deduplicate a data object to another data object (step 452). Characteristics of the data object and the other data object are evaluated based on a set of deduplication policies (step 454). Based on the evaluation, deduplication performed on both data objects is effected (step 456). One such deduplication policy may be characteristics of storage space on which data objects that have been identified for deduplication reside such that a data block residing on a high storage tier is preserved by mapping a data object residing on a low storage to the data object residing on the high storage tier. Further, one such deduplication policy may be I/O access pattern for data objects that have been identified for deduplication such that a data object with less number of I/O accesses is mapped to a data object with a high number of I/O accesses.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data deduplication in storage systems, the method comprising:
   evaluating characteristics of first and second data objects based on a set of deduplication policies, wherein the first and second data objects are selected for deduplication, wherein the first and second data objects are organized on a storage system;

based on the evaluation, determining a master deduplicated copy, wherein the master deduplicated copy is selected from the group consisting of the first and second data objects; and based on the determination, affecting deduplication performed on the first and second data objects, wherein affecting deduplication includes updating mapping information of the first and second data objects, wherein the first data object is deduplicated to the second data object upon determining that the second data object is selected as the master deduplicated copy, wherein the second data object is deduplicated to the first data object upon determining that the first data object is selected as the master deduplicated copy.

2. The method of claim 1, wherein the first and second data objects are selected from the group consisting of a deduplication domain, a storage extent, a LUN, a file and a data block, wherein the data block is a fixed size chunk of a physical disk storage.

3. The method of claim 1, wherein a deduplication domain comprises a set of storage extents, wherein each storage extent of the set of storage extents comprises a set of LUNs, each LUN of the set of LUNs is a logical representation of a subset of physical disk storage.

4. The method of claim 1, wherein a mapping pointer is associated with a data block, wherein the mapping pointer includes a distributed weight indicating whether the data block has been shared.

5. The method of claim 1, wherein a mapping pointer for a data block points to a Virtual Block Mapping object, wherein the Virtual Block Mapping object includes another mapping pointer to refer to a data block and a total distributed weight indicating whether the Virtual Block Mapping object has been shared.

6. The method of claim 1, wherein the characteristics of first and second data objects include I/O activity of the first and second data objects.

7. The method of claim 1, wherein the characteristics of first and second data objects include storage tier information of the first and second data objects.

8. The method of claim 1, further comprising:
based on the evaluation, applying a deduplicating technique on the first and second data objects.

9. A system for use in managing data deduplication in storage systems, the system comprising:
first logic evaluating characteristics of first and second data objects based on a set of deduplication policies, wherein the first and second data objects are selected for deduplication, wherein the first and second data objects are organized on a storage system;
second logic determining, based on the evaluation, a master deduplicated copy, wherein the master deduplicated copy is selected from the group consisting of the first and second data objects; and
third logic affecting, based on the determination, deduplication performed on the first and second data objects, wherein affecting deduplication includes updating mapping information of the first and second data objects, wherein the first data object is deduplicated to the second data object upon determining that the second data object is selected as the master deduplicated copy, wherein the second data object is deduplicated to the first data object upon determining that the first data object is selected as the master deduplicated copy.

10. The system of claim 9, wherein the first and second data objects are selected from the group consisting of a deduplication domain, a storage extent, a LUN, a file and a data block, wherein the data block is a fixed size chunk of a physical disk storage.

11. The system of claim 9, wherein a deduplication domain comprises a set of storage extents, wherein each storage extent of the set of storage extents comprises a set of LUNs, each LUN of the set of LUNs is a logical representation of a subset of physical disk storage.

12. The system of claim 9, wherein a mapping pointer is associated with a data block, wherein the mapping pointer includes a distributed weight indicating whether the data block has been shared.

13. The system of claim 9, wherein a mapping pointer for a data block points to a Virtual Block Mapping object, wherein the Virtual Block Mapping object includes another mapping pointer to refer to a data block and a total distributed weight indicating whether the Virtual Block Mapping object has been shared.

14. The system of claim 9, wherein the characteristics of first and second data objects include I/O activity of the first and second data objects.

15. The system of claim 9, wherein the characteristics of first and second data objects include storage tier information of the first and second data objects.

16. The system of claim 9, further comprising:
fourth logic applying, based on the evaluation, a deduplicating technique on the first and second data objects.

* * * * *